United States Patent [19]
Carlson et al.

[11] Patent Number: 5,496,439
[45] Date of Patent: * Mar. 5, 1996

[54] RECYCLE PROCESSING OF BALED WASTE MATERIAL

[76] Inventors: Willard E. Carlson, 44 St. James Dr., Palm Beach Gardens, Fla. 33418; Ivar H. Stockel, 4005 Gulf Shore Blvd., N. Suite 302, Naples, both of Fla. 33940

[*] Notice: The portion of the term of this patent subsequent to Dec. 21, 2010, has been disclaimed.

[21] Appl. No.: 98,708

[22] Filed: Jul. 28, 1993

[51] Int. Cl.⁶ ........................................... D21B 1/32
[52] U.S. Cl. .................. 162/4; 162/53; 162/55; 162/56
[58] Field of Search ................ 162/53, 17, 18, 162/4, 21, 5, 55, 8, 56, 26, 8; 241/21, 24, 20, 28, 29, 1, 2; 100/37, 104

[56] References Cited

U.S. PATENT DOCUMENTS

| | | | |
|---|---|---|---|
| 2,697,661 | 12/1954 | Hollis | 162/4 |
| 2,999,784 | 9/1961 | Hullmann | 162/53 |
| 3,215,587 | 11/1965 | Guerrieri | 162/53 |
| 3,347,741 | 10/1967 | Hutchison | 162/53 |
| 4,188,259 | 2/1980 | Mamers et al. | 162/4 |
| 4,458,845 | 7/1984 | Marcolus et al. | 241/41 |
| 4,816,117 | 3/1989 | Pfalzer et al. | 162/4 |
| 5,066,363 | 11/1991 | Lee et al. | 162/100 |
| 5,203,966 | 4/1993 | Carlson | 162/DIG. 10 |

FOREIGN PATENT DOCUMENTS 0768865  10/1980  U.S.S.R. .................... 162/53

Primary Examiner—Brenda A. Lamb
Attorney, Agent, or Firm—Willard M. Hanger

[57] ABSTRACT

An improved method of processing baled waste material containing waste paper having fibers contaminated to various degrees for recovering usable cellulosic fiber pulp from the bale in which the bale contents are impregnated with a fiber swelling and debonding fluid by enclosing the bale within a closed chamber and subjecting the chamber and contained bale to multiple pressure environmental conditions, that preferably includes a vacuum, while submerging the bale in the debonding fluid. The impregnated bale contents are allowed to soak for a sufficient period that the lesser degree contaminated fibers become swollen after which the bale is subjected to a sufficiently low degree of pulping agitation as initiates separation of the swollen fibers without significant damage to the fibers and which does not significantly decrease the sheet size of higher degree contaminated bonded fibers and other contaminants. The agitated bale contents are separated in a screen separator into a pulp containing slurry and a reject mass of higher degree contaminated, unswollen fibers and contaminants. If the reject mass contains a significant degree of fibrous material, it is compressed into bale form and again subjected to a multiple pressure liquid impregnation treatment in a closed chamber after which the multiple pressure impregnated bale is subjected to the same or similar recycling operations in separating out the fiber pulp slurry.

6 Claims, 2 Drawing Sheets

RECYCLE PROCESSING OF BALED WASTE MATERIAL

BACKGROUND OF THE INVENTION

The present invention relates to improvements in processing baled waste material containing waste paper articles of various types for recycling the contents of the bale to recover a maximum amount of cellulosic fibers from the various categories and types of paper fiber containing articles that are contained in the bale of waste material with a minimum degradation or damage to the recovered paper fibers.

To enhance the conservation of material resources, particularly forest land, and to reduce the amount of waste material that is disposed in ever increasing landfill areas, widespread interest has developed in recycling waste matter of which a significant portion comprises waste paper articles of assorted types and compositions for recovering the fibers of the waste paper articles that are used in producing recycled paper products. Waste matter of various categories normally is packaged as tightly compacted bales of considerable size and weight for ease of handling and storage. The nature of these tightly compacted and very heavy bales presents serious problems in processing the miscellaneous tightly compacted contents of the bale in an economical and efficient manner such that the fibers recovered from the miscellaneous types of waste paper articles in the bale are of a high quality and free of contaminants with minimal damage to the fibers from being cut, broken or shortened in the recycling defibration operations. Our U.S. Pat. Nos. 5,147,502 and 5,203,966 discuss this problem at considerable length and disclose measures by which the contents of the tightly compacted bales of waste material can be subjected to a pre-recycling conditioning treatment which causes the fibers of waste paper articles contained in the tightly compacted bale to become swollen and the fiber bonding forces substantially weakened prior to defibration of the waste paper articles and separation of the fibers into a liquid suspension slurry. As discussed in our aforesaid patents, this pre-recycling conditioning treatment involves a thorough wetting impregnation of the contents of the compacted baled waste material by discharging a high velocity jet of cellulosic fiber softening and swelling fluid into the interior of the bale as saturates the waste material in the bales with the fluid to a degree as establishes the desired debonding swelling of the fibers of the waste paper articles in the baled waste material. This debonding swelling reduces the bonds between the fibers of the waste paper articles and between the waste paper fibers and contaminants that form a portion of the waste paper articles. Other previously known measures by which the contents of compacted baled waste material can be subjected to pre-recycling conditioning treatment comprise the submergence of the baled waste material in a water-filled trough for a protracted period prior to breaking up the bale and defibrating the water saturated waste paper as in the manner disclosed in U.S. Pat. No. 4,458,845 of Marcalus, et al. However, this old procedure has the serious disadvantage of requiring an excessive time period for the waste paper contents of a tightly compacted bale to become sufficiently saturated with the debonding fluid. Entrapped air within a bale submerged in a water filled trough prevents a high degree of saturation of the waste paper in the bale within a reasonable period of time.

Waste paper contained in baled waste material normally includes a wide variety of types of cellulosic fiber containing articles of which the fibers of some articles are substantially free of contaminants such as wax, plastics, latex, asphalt or other non-fibrous matter. Relatively uncontaminated fiber articles of this nature are broke, post-consumer paper products such as corrugated boxes, discarded office papers, stationery, toweling, etc. The fibers comprising other types of paper articles contain contaminated matter in which the fibers and their outer walls have been penetrated to various degrees by and contain non-fibrous contaminants in which the contaminants provide special qualities to the fibers of the article such as wet strength. Other types of paper articles have fluid barrier coated surfaces in which the contaminant coating establishes a barrier to the penetration of fluids into the interior fibrous portion of the article. Typical of this latter type of article, and which presents serious problems in penetration of a debonding fluid into the barrier coated fibrous matter, are milk cartons, aseptic juice boxes, freezer wrap, foil laminated cartons, coated sanitary products, moisture barrier shipping sacks, etc. After the defibration separation out of the relatively uncontaminated cellulosic fibers of waste paper contained in bales subjected to the pre-recycling conditioning treatment procedures disclosed in the above mentioned patents, it has been the general practice to dispose the non-debonded and contaminant containing or contaminant coated fibrous matter to landfill along with the non-fibrous waste matter and contaminants contained in the bales due to the difficulty of a further separation out of the cellulosic fibers of waste paper articles containing a high degree of contaminated fibrous matter or whose surfaces are coated with a fluid barrier contaminant.

SUMMARY OF THE INVENTION

The object of this invention is to establish a recovery of the maximum amount of high quality cellulosic fibers from all types of fiber containing waste paper articles that are to be found in compactly baled waste material, including such waste paper articles as those having one or more fluid barrier coatings. In furthering the above indicated objective, a series of three experiments were performed in determining the degree of penetration and penetration time for a liquid to penetrate through the exposed edges into the interior of a polymer coated paperboard sandwich (i.e., milk carton samples) by subjecting the samples to one or more liquid impregnation cycles comprising immersion of the sample in a liquid under varying degrees of vacuum pressure environment followed by the reapplication of atmospheric pressure, which is referred to in subsequent discussions as over pressure and can be greater than ambient atmospheric pressure under certain conditions subsequently discussed. The experiments were conducted on polymer coated milk carton samples of which the outer edges had been severed for exposure of the outer edges to liquid penetration into the fibrous interior of the sandwich sample.

TEST RESULTS

Circular discs 14.2 centimeters (cm) in diameter were subjected to three different conditions and the depth of penetration measured after 60 seconds and 180 seconds:

A. A circular disc was subjected to a vacuum of 25" Hg below atmospheric pressure, water was introduced after 3 minutes of evacuation and atmospheric pressure restored after which penetration was observed. This procedure was repeated twice more while the partially penetrated disc was submerged in the water.

B. A circular disc was subjected to a vacuum of 29.4" Hg below atmospheric pressure, water was introduced after 3 minutes of evacuation and atmospheric pressure restored after which penetration was observed. This procedure was repeated while the partially penetrated disc was submerged in the water.

C. A circular disc was subjected to a vacuum of 29.4" Hg below atmospheric pressure, water was introduced after 3 minutes of evacuation and atmospheric pressure restored after which penetration was observed. This procedure was repeated after first draining the water introduced in the first evacuation.

| Trial | Vacuum | Stage | Condition | Penetration Depth (%) | |
|---|---|---|---|---|---|
| | | | | After 60" | After 180" |
| A | 25" HG | 1st Evac. | Not submerged | 37 | 58 |
| | 25" | 2nd | Submerged | 66 | 72 |
| | 25" | 3rd | Submerged | 74 | 76 |
| B | 29.4" Hg | 1st Evac. | Not submerged | 54 | 73 |
| | 29.0" Hg | 2nd | Submerged | 92 | 96 |
| C | 29.4" Hg | 1st Evac. | Not submerged | 49 | 75 |
| | 29.0" Hg | 2nd | Not submerged | 96 | 99 |

In Trials "A" and "B" the 2nd evacuation without removal of water, fine air bubbles were observed emanating from the edges of the discs.

The conclusions from these trials were:

1. One stage of treatment at a vacuum of 29.4" Hg is equivalent to 3 stages at 25" Hg in penetration depth.
2. Removal of the water before the 2nd evacuation appeared to be somewhat beneficial, but to a minor degree.
3. Air is trapped in the interior of the paper-polymer sandwich after the first stage of penetration, which inhibits further penetration, and further evacuation of the air is required to obtain more complete penetration of the fluid.
4. Since air is trapped by the impervious polymer barriers, an over pressure of atmospheric or greater would be an aid increasing the depth of fluid penetration. For instance, the depth of penetration after a 29.4" Hg vacuum followed by one atmosphere (14.7 psi) over pressure would be 75% after 180 seconds; and 99%+ after the 2nd evacuation @ 29.0" Hg followed by one atmosphere over pressure. At the lower vacuum of 25" Hg, one atmosphere of over pressure would increase the penetration from 58% after the 1st evacuation to 72% after the second evacuation, and to only 76% after the 3rd evacuation.
5. From these trial results the combination of 29" Hg or more of vacuum, followed by over pressure, and/or removing the fluid after each stage of treatment, will permit effective penetration treatment of polymer sandwiched paper-board. The effects quantified in the above trials have been observed in the depth of penetration of densely packed bales of waste containing paper; bale densities of 20 to 35 pounds per cubic foot.
6. A modelling of these test results to determine the effectiveness of the application above atmospheric pressure after the evacuation shows that the calculated depth of penetration of trial "B", if conducted at a 500 psig over pressure instead of 14.7 psia, the expected depth of penetration would be increased from 73% to 95% after a 34 second penetration time.
7. A further significant finding derived from observation of the tests is that the polymer outer coating of the samples became separated from the fibrous material comprising the central portion of the sandwich and remained as an integral unit of contaminant matter having little or no reduction in size from its original outer covering dimensions. As such, the relatively large segments of integral contaminant matter separated from the fibrous center of the sandwich are more easily separable from the cellulosic fibers of the center portion of the sandwich in the recycling defibration of the cellulose matter.

From these experiments and computer modelling based thereon, we have discovered the effects which the degree of vacuum pressure and subsequent over pressure environment and the number of sequential applications of vacuum and over pressure environments have on the degree to which liquid penetrates into the interior of a polymer coated paperboard sandwich under the imposed pressure environments. Through computer modelling of the above indicated experimental data, certain conclusions can be derived relative to the pressure environment which would be optimum for penetration into paper fiber containing articles which contain significant amounts of contaminants or whose surfaces have a fluid barrier coating of a contaminant. The test results were modelled in applying the results to strips of polycoated paperboard sandwiches as well as to discs and also to the application of over pressures (subsequent to liquid submergence under vacuum) that are greater than atmospheric pressure to include a number of combinations of applications of vacuum and over pressure.

All of the modelling results apply to treatments of bales containing polycoated paperboard which remain submerged throughout the second and subsequent cycles and to that polycoated paperboard which is located in the bottom of a submerged bale. Therefore, the amount of vacuum applied in the modelling in the 2nd and subsequent cycles is corrected for immersion in three feet of water.

The penetration times are first estimated for discs which are 14.2 centimeters in diameter and for strips which are 14.2 centimeters wide. Times for other diameters and widths are estimated by multiplying them by the square of the ratio of their diameters or widths as the case may be. The results are illustrated for one inch discs and strips.

In the Table below, the column titled Initial & Cycle Time includes estimates of the times required for 1 inch discs and strips:

to open and close the treatment vessel door, load and unload a bale, establish the initial vacuum, add the fluid, repressurize and withdraw the treatment fluid—a one-time total of six minutes;

and, in the 2nd and subsequent cycles, to reestablish vacuum and maintain it for an additional three minute dwell time which was observed to be required to complete the period of bubbling from the polycoated board which was observed in the experiments—a total of 5 minutes for each cycle of treatment after the first.

Total bale treatment time is Initial plus Cycle Time (includes Penetration Time).

The following Table indicates the extended results derived from modelling the above indicated Test Results:

EXTENDED RESULTS FROM MODELLING

| Board geometry & depth penetration | Number of cycles | Vacuum in Hg · g | Over pressure in psig | Pressure Ratio 1st/2nd+ | Penetration time in min. & sec. 14.2 cm | 1.0 in. | Initial plus Cycle Time in mins for 1" discs & strip |
|---|---|---|---|---|---|---|---|
| Disc/95% | 1 | −28.9 | 500 | 1051 | 34" | 1" | 6' |
| Disc/95% | 2 | −28.9 | 53 | 137/38 | 7'11" | 14" | 11' |
| Disc/95 | 3 | −28.8 | 0 | 28/8.0 | 39'20" | 1'16" | 16' |
| Disc/95% | 4 | −26.5 | 0 | 8.8/4.9 | 42'20" | 1'21" | 21' |
| Disc/95% | 5 | −23.9 | 0 | 4.9/3.4 | 43' | 1'23" | 26' |
| Strip/98% | 1 | −28.9 | 500 | 1051 | 13" | 1" | 6' |
| Strip/98% | 2 | −28.9 | 203 | 444/121 | 38" | 1" | 11' |
| Strip/98% | 3 | −28.9 | 24 | 80/20 | 3'19" | 6" | 16' |
| Strip/98% | 4 | −28.1 | 0 | 17/6.8 | 8'20" | 16" | 21' |
| Strip/98% | 5 | −25.9 | 0 | 7.4/4.5 | 7'50" | 15" | 26' |
| Strip/98% | 6 | −23.7 | 0 | 4.8/3.4 | 7'22" | 14" | 31' |

CONCLUSIONS

Penetration times for 1 inch discs and stripes are not significant. Therefore, for design purposes total treatment time is the initial plus cycle times which becomes excessive as the number of cycles exceeds six. The preferred treatment is a one-cycle process with an over pressure of 500 psig and a vacuum of −29 inches Hg. gage, both of which are easily incorporated into equipment for an operating bale treatment process.

The three experiments and the resultant modelling indicate that an effective pre-recycling conditioning penetration of liquid into a bale containing paper and paperboard articles of a nature that exposure of the fibers of the articles to fluid wetting are restricted can be expected within a reasonable bale treatment time under the following parameters:

(1) introducing fluid into the bale in which the bale is subjected to consecutive cyclic environments of a vacuum pressure of at least 25" of mercury below atmospheric pressure (−25" Hg gage) followed by an over pressure of at least one atmosphere.

(2) When the applied vacuum pressure is less than −25" Hg gage, an over pressure greater than one atmosphere is required.

(3) A ratio of the absolute pressures of the over pressure and vacuum pressure of six is required for an effective cycle.

(4) When minimum intensities of acceptable vacuum pressure followed by an over pressure are involved, a cycle of at least five applications of vacuum and over pressure are needed.

(5) A preferable single cycle of bale treatment would comprise a vacuum pressure application as low as −29" Hg gage prior to admission of treating fluid, followed by an over pressure of 500 psig.

(6) Single cycle bale treatment time is estimated at six minutes or less, with an additional five minutes required for subsequent cycles.

Whereas a convenient manner of practicing the invention in which the debonding liquid is caused to penetrate into the interior of a waste material bale by extracting a substantial amount of air from a sealed chamber in which the bale is isolated by subjecting the chamber to a negative pressure environment prior to introducing liquid into the chamber after which the chamber containing sufficient liquid to submerge the bale is subjected to an over pressure of at least one atmosphere during which the liquid penetrates throughout the bale contents, the same result could be achieved by subjecting the bale to differential positive pressure environments, instead of a negative pressure followed by a positive pressure, in establishing a flow of liquid throughout the contents of the tightly compacted bale.

A basic feature of the invention, applicable as the initial operation in the recycling of baled waste material prior to initiating a defibration of fibrous matter in the bale, is establishing a wetting impregnation of the bale contents with a fiber swelling and debonding fluid by isolating the bale within a closed chamber and subjecting the closed chamber and contained bale to one or more cycles of liquid insertion under multiple pressure environments each comprising:

(1) establishing a first (preferably vacuum) pressure within the interior of the closed chamber, (2) introducing into the pressurized chamber a sufficient amount of debonding liquid as submerges the bale, (3) subjecting the interior of the liquid containing chamber to a second (preferably positive) pressure greater than the first pressure and (4) maintaining the chamber containing the fluid and bale at the second pressure for a sufficient time as establishes a penetration of the liquid substantially throughout the interior of the bale.

After a thorough wetting impregnation of the bale with the swelling and debonding liquid, the bale is removed from the chamber and maintained in a quiescent condition for a sufficient time as establishes a debonding swelling of the waste paper article cellulosic fibers exposed to the debonding liquid after which the contents of the liquid impregnated bale are subjected to defibration and separation out of the swollen cellulosic fibers from the remaining bale reject contents. If the baled waste paper articles comprise fibrous material sufficiently contaminated or coated with a fiber barrier contaminant that the bale reject contents contain a significant amount of non-debonded fibers, this bale reject portion preferably is again subjected to one or more cycles of liquid impregnation under multiple pressure environmental conditions and further defibration recycling.

DESCRIPTION OF THE INVENTION

Figure 1:
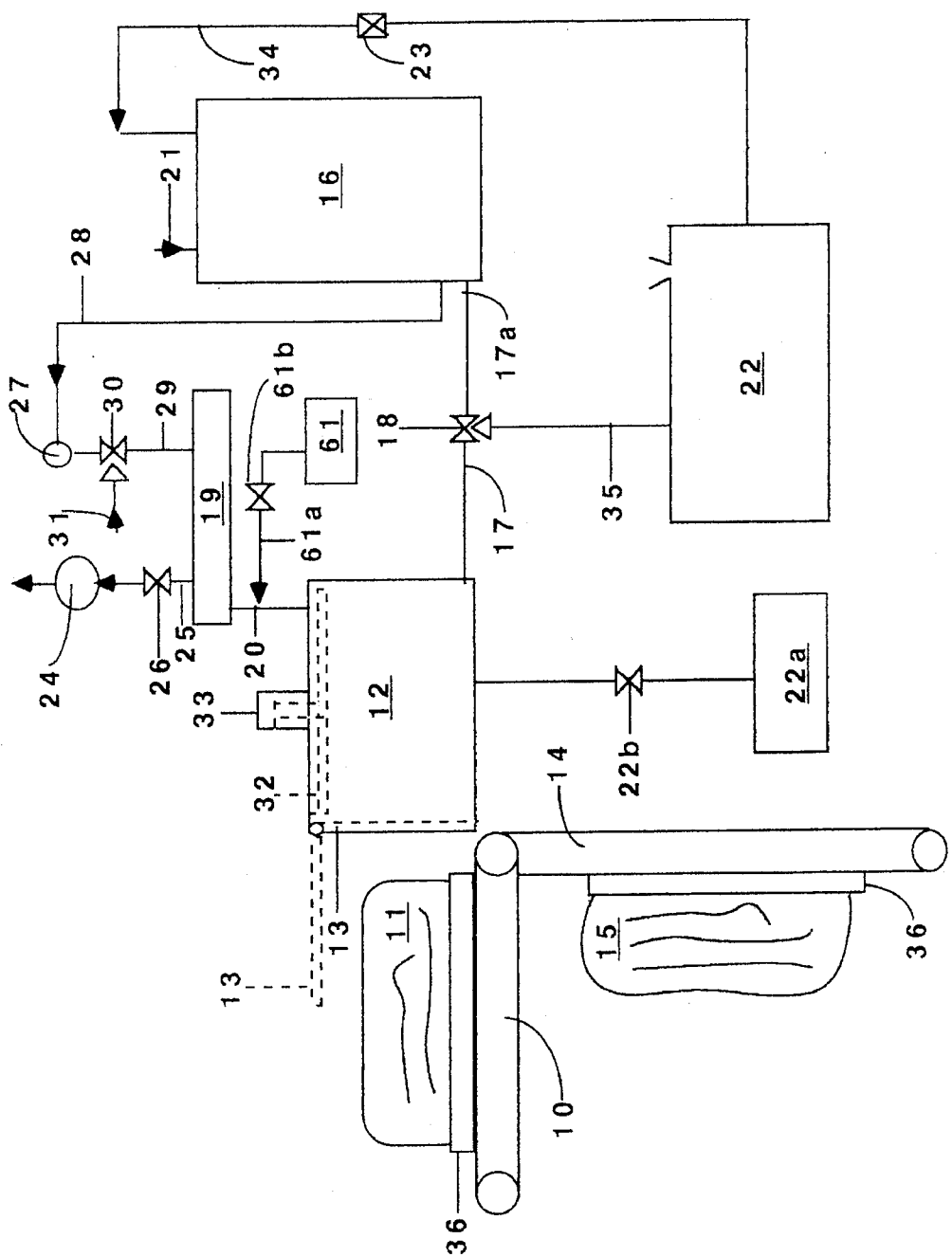
FIG. 1 is a schematic diagram illustrating waste material bale multiple pressure liquid impregnation apparatus and process of the invention.
Figure 2:
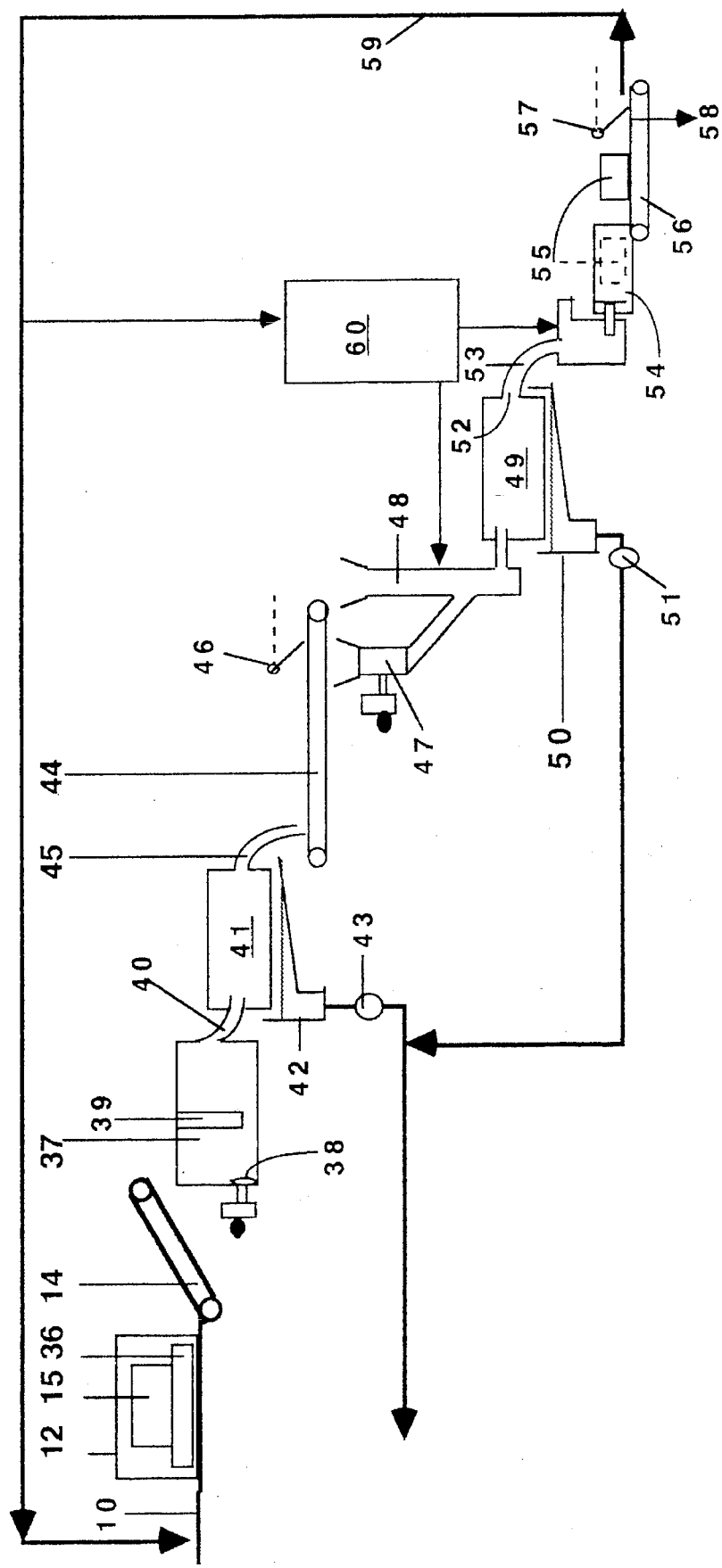
FIG. 2 is schematic diagram illustrating apparatus and method for recycling the contents of the waste material bale impregnated in accordance with FIG. 1.

First referring to FIG. 1, representing a schematic arrangement by which the bale multiple pressure liquid impregnation aspect of the invention can be carried out, an infeed conveyor system 10 is arranged in a manner to transport waste material bales 11 supported in a shallow tray 36 into the interior of a vacuum treatment chamber 12 through an access door 13, illustrated in dotted lines in its open position, and an outfeed conveyor system 14 is arranged to remove the liquid impregnated bale 15 from within the treatment chamber 12 for further processing in the manner subsequently described in FIG. 2. Treatment chamber 12 connects through a line 17 and a three-way reservoir valve 18 to a treatment liquid reservoir 16 and through the three-way valve 18 and drain line 35 to a treatment fluid make-up tank 22. To minimize the interior dimensions of the treatment chamber 12 in accommodating the largest bale intended for treatment, the treatment chamber capacity can be supplemented by connecting through a line 20 to an overflow header 19. However, the header can be eliminated if the treatment chamber is of sufficient size to accommodate the total volume of treatment liquid that would be required for the treatment cycles discussed herein. Various other obvious alternative arrangements can be utilized to ensure that a sufficient amount of treatment liquid is maintained in the treatment chamber to submerge the bale during the treatment cycles. Reservoir 16, having an atmosphere connection line 21, is connected to a treatment fluid make-up tank 22 through a replenishing line 34 containing a valve and pump assembly 23. A rinsing fluid tank 22a is connected to the treatment chamber 12 through a line containing a shut-off valve 22b. The suction side of a vacuum pump 24 connects to the interconnected header 19 and treatment chamber 12 through line 25 containing a shut-off valve 26. A second source 61 of a treatment gas, typically of the nature of ammonia or oxidizing gas also connects into line 20 through line 61a and valve 61b. A high pressure pump 27 with its suction side connected to the liquid reservoir 16 through line 28 connects through its pressure side and a three-way pressurizing valve 30 through line 29 to the interconnected header 19 and treatment chamber 12, the third side 31 of the three-way pressurizing valve connecting to atmosphere when set to the third position. A bale stabilizing arm 32 supported within the treatment chamber 12 for vertical movement by an actuating mechanism 33 is adjustable vertically into and out of contact with a bale contained in the treatment chamber.

Referring now to FIG. 2, representing a schematic arrangement by which the bale of waste material impregnated in the manner of the invention represented in FIG. 1 can be optimally recycled for the recovery of a maximum amount of cellulosic fibers of high quality from all types of paper articles. The waste material bale 15, previously subjected to multiple pressure debonding fluid impregnation in the manner of FIG. 1, is supported in a shallow tray 36 for removal and transportation by the outfeed conveyor system 14 and deposited into a fiberizer or fiber dispersion unit 37 containing water or other suitable pulping liquid supplied from a suitable source (not illustrated). The fiberizer is a conventional type in which sufficient agitation is generated in the pulping liquid as separates or prepares for separation the waste paper fibers that have become swollen and debonded in the liquid impregnated bale but the agitation is not sufficient to damage the fibers significantly or significantly diminish the size of agglomerations of contaminated fibers or segments of contaminants such as foils, laminates, etc. that become debonded from the fibrous material in the vacuum treatment chamber 12. A typical fiberizer tank 37 contains a rotor 38 mounted for rotation substantially flush with an interior sidewall of the fiberizer tank to prevent entanglement with segments of contaminated material. Preferably a vertical baffle 39 extends downwardly into the interior of the fiberizer tank 37 between the rotor 38 and the outlet at the top of the fiberizer leading into the intake 40 of a pulp separator 41 conveniently of the type of a Trommel Screen. The pulp receiver 42 of the separator 41 connects to the suction of a slurry recovery pump 43 which discharges into a pulp cleaning or processing system from which reclaimed paper products are produced. A waste reject conveyor 44 extending from the waste discharge conduit 45 of the pulp separator 41 has a two-position diverter 46 which channels reject waste material at the exit end of the conveyor 44 either into the intake 48 of a second pulp separator 49 or into a shredder 47 that empties into the intake 48 of the second pulp separator 49, also of the nature of a Trommel Screen which has a pulp receiver 50 connecting to the suction of a slurry pump 51 that discharges into the pulp cleaning or processing system. The waste outlet 52 of the second separator connects through a waste discharge line 53 to a hydraulic liquid extractor and baler 54 which both extracts liquid from the reject waste material contained in the extractor and compacts the extractor contents into a semi-wet reject bale 55. A discharge end of the extractor-baler 54 communicates with a disposal conveyor 56 at the discharge end of which is a two-position diverter 57 which channels the reject bale 55 either to a waste disposal destination 58 (e.g., landfill) or to a secondary recycling conveyor system 59 arranged to redeposit the reject baled material 55 onto the infeed conveyor system 10 of the vacuum-pressurizer liquid treatment system of FIG. 1 or a CTDS unit 60 subsequently discussed. Inasmuch as a second vacuum-pressurized liquid treatment of a reject bale 55 received into the treatment chamber 12 from the secondary bale recycling conveyor system 59 would decrease the productive capacity of the vacuum-pressurized liquid treatment system of FIG. 1, alternatively the secondary bale recycling conveyor system 59 can be adapted to divert selected reject baled material 55 into a "combined-treatment-dispersion-separation" (CTDS) unit 60 of the type described in our U.S. Pat. No. 5,271,805 arranged to discharge separated pulp slurry into the second pulp separator intake 48 and reject materials into the extractor and baler 54.

Referring again to FIG. 1, the cycle for establishing the multiple pressure or vacuum-pressurizing impregnation treatment of an untreated bale 11 is initiated by the introduction into the treatment chamber 12 of the bale on shallow tray 36 and closing the chamber door 13 to seal the chamber after which the vacuum pump valve 26 is opened to connect the suction side of the vacuum pump 24, which most conveniently can be continuously operated, to the interconnected header 19 and treatment chamber 12 which have been isolated from the remainder of the system by placing the three-way reservoir valve 18, the three-way pressurizing valve 30 and the rinsing valve 22b in a closed position, thereby establishing a vacuum pressure within the bale containing treatment chamber 12 to the capacity of the vacuum pump. During this evacuation period the reservoir 16 can conveniently be resupplied with a treatment fluid from the make-up tank 22 through the connecting line 34 and its normally closed valve and pump assembly 23. The treatment fluid can be any of the well-known fiber swelling and debonding fluids of the nature of plain water or preferably an alkaline fluid having a pH of about 7.0–11.5 of the nature of dilute ammonium hydroxide or fluid containing an oxidizing agent, etc. Obviously, stronger treatment fluids are required when the fibrous matter comprising the waste paper articles is heavily contaminated or coated with a fluid barrier contaminant. During or prior to evacuating air from the treatment chamber 12 the stabilizing arm 32 is lowered into contact with the bale to clamp it into a fixed position by activating the arm actuating mechanism 33. Following air evacuation from the interconnected header 19 and treatment chamber 12 to substantially the capacity of the vacuum pump 24, the three-way reservoir valve 18 is set to an open position interconnecting the treatment chamber 12 and the reservoir 16 whereby treatment liquid from the reservoir 16 flows through the line 17 filling the treatment chamber 12 and header 19.

Following evacuation and filling of the treatment chamber 12 with treatment liquid, atmospheric over pressure is established in the fluid filled treatment chamber 12 and header 19 by closing the three-way reservoir valve 18 and the vacuum pump valve 26 and positioning the three-way pressurizing valve 30 to its third position 31 atmosphere connection, thereby establishing an atmospheric over pressure in the liquid filled treatment chamber 12 containing the submerged bale through the line 29 connected into the header 19. If a super atmospheric over pressure is to be established in the liquid filled treatment chamber 12 containing the submerged bale, the three-way reservoir valve 18 and vacuum pump valve 26 are closed to isolate the treatment chamber, the high pressure pump 27 is activated and the three-way pressurizing valve 30 is opened to connect the discharge of the high pressure pump 27 into the header 19 and treatment chamber 12 through the line 29, the high pressure pump drawing liquid from the reservoir 16 through line 28.

If the bale conditioning treatment is to comprise a single evacuation-pressurizing cycle, after the over pressure has been applied for a sufficient time that the treatment liquid penetrates throughout the bale and its voids to substantially the extent the over pressure can provide, excess treatment liquid may be drained from the treatment chamber 12 into the make-up tank 22 by setting the three-way reservoir valve 18 to its third position connecting line 17 into the drain line 35 leading into the make-up tank 22 and setting the three-way pressurizing valve 30 to its atmospheric opening side 31 with the vacuum pump valve 26 closed and the high pressure pump deactivated. After drawing excess liquid from the treatment chamber 12 the bale stabilizing arm 32 is raised, the treatment chamber door 13 opened and the liquid impregnated bale 15 removed by the outfeed conveyor system 14 and transported into the recycling processing system of FIG. 2 in which the swollen and debonded fibers of the waste paper in the impregnated bale 15 are separated from the non-fibrous contaminated matter of the bale contents in the manner subsequently described with respect to FIG. 2. If the nature of the waste paper articles in the bale are such that multiple vacuum-pressurizing cycles are considered necessary to obtain the desired degree of debondment of the paper fibers from contaminants, after the initial application of over pressure, a second or more evacuation-pressurizing cycles are initiated by utilizing the same procedure discussed for the first cycle prior to draining excess fluid from the treatment chamber 12 and removal of the impregnated bale. Also prior to removal of the liquid impregnated bale from the treatment chamber and before or after excess treatment fluid is drained into the make-up tank, the impregnated bale can be rinsed with a suitable rinsing fluid or second type of treating fluid drawn from the contents of the rinsing tank 22a by placing the vacuum pump valve 26 in its open position connecting the suction side of the operating vacuum pump 24 through line 25 into the interconnected header 19 and treatment chamber 12 and opening the rinsing tank valve 22b, the reservoir connecting valve 18 being closed.

It should be understood that the devices and procedures described above are illustrative only of the basic aspects of the invention and many other devices and procedures can be utilized in establishing the multiple pressure environments of the invention to which the baled waste material is subjected in practicing the invention. For instance, the discharge side of the vacuum pump can be connected through valving and connection arrangements that are obvious to those skilled in the art as would apply a low degree of over pressure greater than atmospheric onto the liquid filled treatment chamber.

Referring again to FIG. 2, the bale 15 impregnated with the swelling and debonding liquid is maintained in a quiescent state on the outfeed conveyor system 14 for a sufficient time for the debonding liquid to come into contact with and be sorbed by exposed fibers of the waste paper articles in the bale after which the waste bale 15 is deposited in the fiberizer 37 in which agitation of the fiberizer pulping fluid initiates a separation between the swollen waste paper fibers and between these fibers and agglomerate masses of contaminated fibers and non-fibrous contaminant masses debonded from the fibrous material by the vacuum-pressurizing conditioning treatment previously described. The agglomeration of separated fibers and non-debonded fiber material and integral masses of contaminants agitatively separated in the fiberizer 37 flow under the fiberizer baffle 39 and out of the fiberizer under the pressure generated by the fiberizer rotor 38 into the accumulator 40 of the screen separator 41 in which the agglomerate wetted masses are separated into the two components of: (1) a fiber-liquid slurry collected in the separator receiver 42, which is discharged through pump 43 to a source of further pulp refining, and (2) rejects comprising wetted masses of contaminant containing or coated fibrous material and non-fibrous contaminants that flow through the separator discharge line 45 and are deposited on the waste conveyor 44. The wetted reject masses deposited on the waste conveyor 44 may contain a substantial amount of fibers with some degree of contamination and from which separation is possible, e.g., plastic bags filled with relatively uncontaminated paper articles, contamination coated or impregnated paper, etc. If the reject masses on the conveyor 44 include paper articles of a nature that the surfaces are coated or the articles are protected by some type of fluid barrier, the diverter 46 at the end of the conveyor is positioned to channel the reject mass into the shredder 47 in which the reject mass material is sufficiently severed to expose end surfaces to liquid penetration after which it is deposited in the accumulator 48 of the second separator 49. Otherwise, the diverter 46 is positioned to channel the reject masses on the conveyor directly into the accumulator 48 of the second separator 49 in which the material is segregated into the same two components as in the first separator 41 of a fiber-liquid slurry collected in the receiver 40 from which pump 51 discharges the slurry into the pulp cleaning and processing system and a reject mass flowing from the second separator waste outlet 52 through the waste discharge line 53 into the hydraulic liquid extractor 54 which extracts liquid and presses the reject mass into a compacted semi-wetted bale 55 which is deposited onto the disposal conveyor 56. If the compacted wetted bale 55 has a significant paper fiber content of about 5% or more, as would make it worthwhile to reprocess the contents of the compacted wetted bale 55 for a second time through the vacuum-pressurizing treatment conditioning in the treatment chamber 12 displayed in FIG. 1, the disposal conveyor diverter 57 can be positioned to channel the semi-wetted reject bale 55 onto a secondary bale recycling conveyor system 59 which deposits the bale onto the infeed conveyor system 10 of the vacuum-pressure treatment system of FIG. 1 from which the wetted reject bale is again processed for extraction of paper fibers in the same manner as previously described. If reintroduction of the semi-wetted reject bale 55 into the vacuum-pressure impregnation system of FIG. 1 is determined to overload the productive capacity of that system and the semi-wetted reject bale 55 is diverted by the secondary bale recycling conveyor system into the CTDS unit, this unit pumps the pulp slurry recovered from the bale into the accumulator 48 of the second separator unit 49 and deposits the remaining contaminated masses into the hydraulic liquid extractor baling unit 54.

The baled waste material, after being subjected to liquid impregnation under the described cycles of multiple pressure environmental conditions, is of a nature that moderate agitation of the bale causes the contents to become dispersed into a flotsam comprising a slurry of liquid suspended cellulosic fibers and other small particles mixed with chunks of contaminated, non-debonded fibrous material, contaminant coatings separated from fibrous material and non-fibrous contaminants largely retaining their original dimensions. Due to the lack of an appreciable diminution in the size of contaminant containing bonded fibrous material and contaminant matter contained in the flotsam created in and discharged from the fiberizer 37, the slurry that passes through the screen of the separator and collected in the receiver 42 contains small amounts of contaminant particles which results in a low degree of clogging of the screen separators. Due to the nature of the flotsam produced in the fiberizer and the rejected matter discharged from the screen separator or being processed through the recycling system, this reject matter does not flow through pumps in being processed, but flow establishing means, such as the flush mounted rotor 38 of the fiberizer are utilized in causing the liquidized reject flotsam to pass through the recycling system. Accordingly, the usual problem encountered in recycling systems of clogged pumps is not present in the system of the described invention. It should be further recognized that the number of screen separators incorporated in a recycling system of the nature of this invention can vary in accordance with the nature of the types of waste paper that are contained in the waste material.

It should be further understood that the foregoing disclosure involves typical embodiments of the invention and that numerous modifications or alterations may be made therein without departing from the spirit and scope of the invention as set forth in the appendant claims.

What is claimed is:

1. In a process for recovering cellulosic fibers from wastepaper contained in baled waste material by:
   (A) treating said baled waste material with a fiber softening and swelling liquid to establish fiber debonding swelling of cellulosic fibers in said waste paper forming debonded swollen fibers by confining said baled waste material within a closed chamber for a period during which at least one cycle of consecutive differential pressure conditions is established and sufficient of said liquid is admitted to submerge said baled waste material and
   (B) removing the fluid treated baled waste material from said chamber and subjecting it to fibrillation for separation out of said debonded swollen fibers;
   the improvements wherein said step of treating said baled waste material in said chamber further includes the steps of:
   (a) establishing a first differential pressure condition of negative pressure within said chamber,
   (b) after completing step (a) admitting sufficient of said liquid as submerges said baled waste material,
   (c) establishing a last differential pressure condition of positive pressure within said chamber and maintaining a sufficiency of said liquid within said chamber as submerges said baled waste material for a finite period sufficient for said liquid to penetrate throughout said baled waste material,
   (d) after completing step (c) removing said baled waste material from confinement by opening said chamber to the atmosphere.

2. In the process of claim 1, the further improvement wherein said last differential pressure condition is greater than atmospheric pressure.

3. In the process of claim 1, the further improvement wherein said first differential pressure condition is less than 5 inches of mercury.

4. In the process of any one of claims 1–3, the further improvement wherein the ratio of said last differential pressure condition to said first differential pressure condition is at least six.

5. In the process of claim 4, the further improvement wherein additional consecutive positive and negative pressure conditions are established in said chamber in the period between establishing said first and last differential pressure conditions.

6. In the process of any one of claim 1–3, the further improvement wherein additional consecutive positive and negative pressure conditions are established in said chamber between establishing said first and last differential pressure conditions.

* * * * *